Patented Feb. 4, 1941

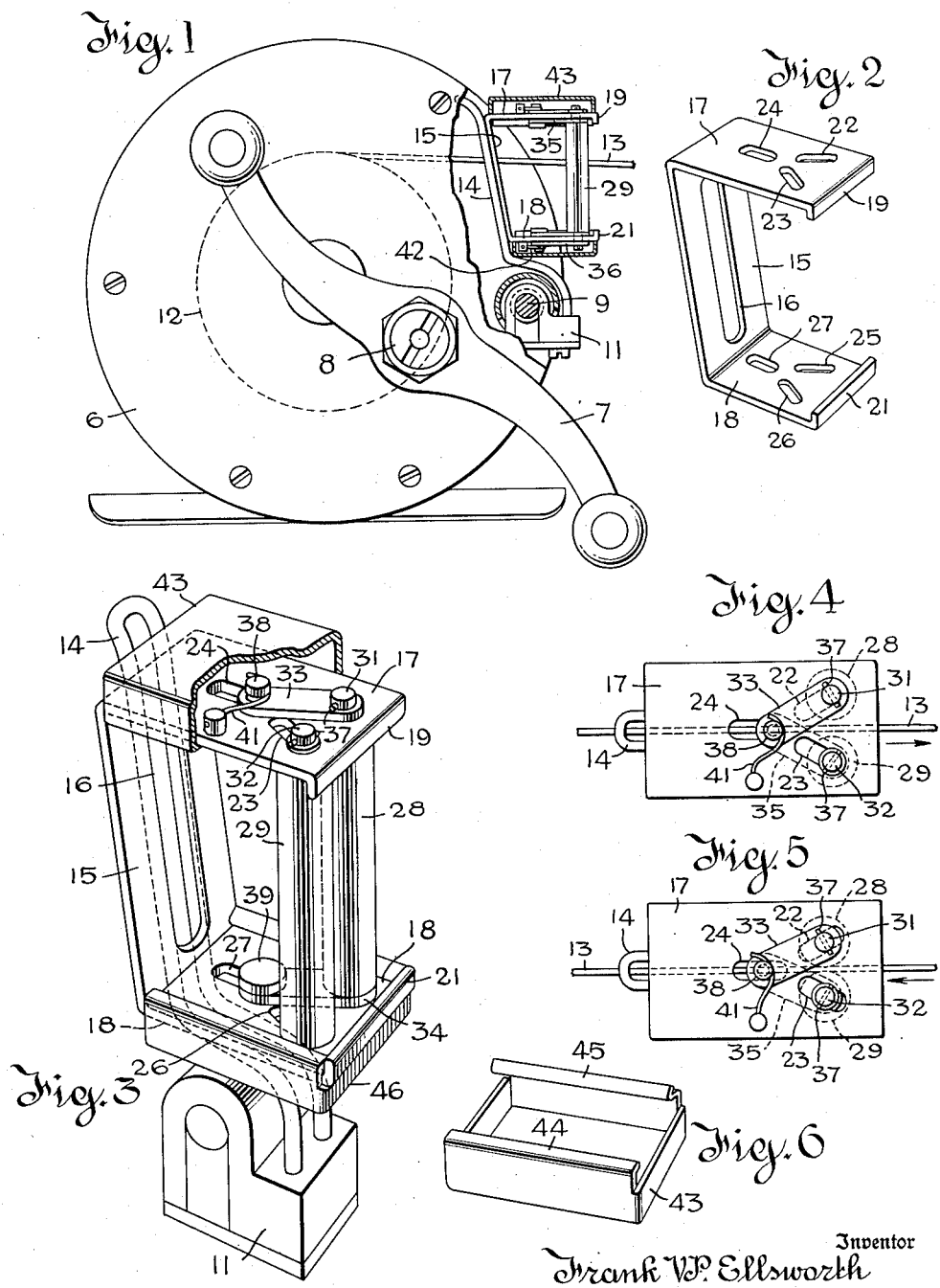

2,230,940

UNITED STATES PATENT OFFICE 2,230,940

TENSIONING DEVICE FOR FISHING REELS

Frank V. P. Ellsworth, Hot Springs, Ark.

Application September 3, 1940, Serial No. 355,239

6 Claims. (Cl. 242—84.4)

This invention relates to fishing reels and particularly to an improved line guide which serves to develop a uniform tension on the line between the guide and the reel during winding but exercises little or no resistance to passage of the line as it is withdrawn or unwound from the reel.

The development of a moderate and uniform tension in the line as it is wound on the reel is conducive to even winding which is reflected in smoother action of the reel during casting. The tensioning line guide must be compact and very light. It must be highly sensitive. It should be so devised that it guides the line properly whether the reel be empty or full and at all intermediate stages. It is desirable that it be of such form and dimension that it may be mounted on the level-winding guide commonly incorporated in commercial fishing reels, this being a preferred but not the only possible location for such a guide.

Generally stated, the invention contemplates a pair of slender elongated rollers which are guided at their opposite ends in converging slots. The interval between these two rollers is in effect the line guide. The rollers are caused to act in unison by two pairs of links, the links of each pair engaging the pintles on which the rollers turn and being connected to a common pivot pin which is guided in a third slot. The center line of this third slot bisects the angle between the center lines of the converging slots which guide the tensioning rollers.

Light springs acting on the common pivot pin connecting the two links of each pair draw the rollers in a converging direction, producing an initial but light engagement of the rollers with the line. Except for such initial engagement reliance is placed upon the draft of the line upon the rollers to produce the desired engaging and disengaging reaction. The line guiding slot is the interval between the two rollers, and is of such length as to accommodate the build-up of the wound line upon the reel.

That being the general principle of the invention, a practical embodiment which has demonstrated successful operation in actual use will now be described by reference to the accompanying drawing, in which:

Figure 1 is an end elevation on an enlarged scale of a fishing reel of the level winding type having my invention applied to the line guide thereof. In this view only the general features of the reel are illustrated, the purpose being to indicate the environment in which the invention is preferably used and to illustrate its functional relation to the winding element of the reel and to the level winding mechanism.

Fig. 2 is a perspective view on a somewhat more enlarged scale of the frame member of the tensioning line guide showing the arrangement of the slots in the end plates.

Fig. 3 is a perspective view of my improved tensioning guide mounted in the level winding carriage, and drawn on a still larger scale. In this view the upper end closing cap is partially broken away to illustrate the internal construction.

Fig. 4 is a plan view of the line guide mechanism with the top cover cap removed showing the position assumed by the parts during casting or unwinding of the reel. In this view the separation of the rollers is slightly exaggerated to make clear the tendency of the rollers to clear the line.

Fig. 5 is a view similar to Fig. 3 but showing the tensioning position assumed during reeling in of the line.

Fig. 6 is a perspective view of an end closure cap.

Referring first to Fig. 1, the end housing of a fishing reel of ordinary form is indicated at 6. The winding handle 7 is mounted on an offset shaft indicated at 8. The reel may or may not be of the multiplying type since the present invention is applicable to a wide variety of reels. The reference numeral 9 indicates the double-threaded shaft or spiral cam which causes the level winding carriage 11 to move back and forth in a direction parallel with the axis of the reel proper as the reel is operated and to wind and to unwind. This is a well known level winding mechanism for which no novelty is here claimed. Hence it is deemed unnecessary to elaborate the level winding feature. The level wind feature is convenient and desirable, but is not indispensible to the operation of my tensioning line guide. Though the line guide will be described as mounted on the carriage 11, it must be understood that the tensioning line guide can be located at any point in which it can exercise the desired tensioning action on the line.

The dotted circle 12 is intended to represent the contour of the line wound on the reel and the line proper extending from the reel to the first guide on the rod (not shown) is indicated at 13. The carriage 11 of most reels carries a slotted traversing line guide member indicated generally at 14, the line being directed through the slot in the guide member 14. It is not necessary but is convenient to mount my improved line guide on the slotted guide member 14, and it is so shown. The improved guide might be mounted in any preferred way on the carriage 11, or it can be located at any other suitable point in the path of the line between the reel and the first line guide on the rod.

The frame for the line guide is a strip of metal bent to form, as clearly shown in the drawing, so that it provides a supporting back plate 15 with line slot 16, a top plate 17, and a bottom plate 18. The top and bottom plates are parallel with each other. The back plate 15 is mounted on the guide member 14 with the slot 16 registering with the slot in the member 14. It may be mounted by soldering, welding or any other convenient manner. The angle of the back plate 15 to the top and bottom plates is chosen to conform to the guide 14 in the embodiment illustrated. The length of the slot 16 is such as to accommodate the change in diameter of the reeled line 12. The top plate 17 has a depending flange 19 and the bottom plate 18 has an upstanding flange 21 which, in conjunction with the ends of the slot 16, limit the path of the line 13 so that it can never reach the ends of the tensioning rollers hereinafter described and can never become fouled on the guiding linkage which positions such rollers.

In the top plate 17 are two converging slots 22 and 23 whose center lines intersect on the path of the fishing line 13, as viewed in Figs. 4 and 5, the angle between said center lines being bisected by the fishing line 13. There is a third slot 24 whose center line is parallel with the center line of the fishing line 13 as it passes through the guide structure. The bottom plate 18 has similar slots 25, 26 and 27.

The line guiding rollers 28 and 29 are preferably tubular sleeves journaled on the pins 31 and 32 respectively. These pins pass through the rollers from end to end and also pass through respective pairs of links hereinafter described. This construction is preferred to an approximately equivalent arrangement using solid rollers with trunnions of reduced diameter on the ends, because such trunnions would develop friction in the slots 22, 23, 25 or 26 whereas the sleeve rollers will rotate more freely on the pins.

The pin 31 passes through the roller 28 and at opposite ends of that roller passes through the slots 22 and 25 and also through two links, 33 which is above the top plate 17, and 34 which is above the bottom plate 18. The pin 32 which passes lengthwise through the roller 29 passes through the slots 23 and 26 and also through the link 35 below the top plate 17 and the link 36 below bottom plate 18. Small retaining cotters 37 are used to retain the parts in assembled relation.

The links 33 and 35 are hinged together by a pin 38 which is guided in the slot 24. Similarly, the links 34 and 36 are pivoted together by pin 39 which works in the slot 27. The pin 38 is urged to the left, as viewed in the drawings, by a light bow-spring 41 and the pin 39 is similarly urged by a light bow-spring 42. The springs 41 and 42 engage circumferential grooves in the respective pins 38 and 39, as shown, and thus serve to retain these pins without the provision of other retaining means. These springs are of wire and mounted in studs, as shown, but it seems unnecessary to elaborate these minor details of construction.

To house the ends of pins 31 and 32 and the links 33 and 36, small removable caps are snapped upon the top plate 17 and the bottom plate 18. The upper cap is indicated at 43 (see Fig. 3). As shown in greater detail in Fig. 6, cap 43 has one right angle flange 44 which is first engaged with an edge of the top plate 17, and opposed to that has a beveled snap flange 45 which may readily be forced on and off the opposite edge of the plate 17. A similar cap 46 is shown applied to the bottom side 18. It will be observed that these caps are cut away at their forward and rear ends to afford clearance for the plate 15 and for the flanges 19 or 21 as the case may be.

When the line 13 is drawn out, as indicated by the arrow in Fig. 4, the draft of the line on the rollers 28 and 29 moves the rollers in a diverging direction. The springs 41 and 42 tend, however, to maintain the rollers in contact with the line so that when the line is wound in, as indicated by the arrow in Fig. 5, these springs and the draft of the line both produce converging motion of the rollers. Thus the rollers exercise a moderate but greater tensioning action on the line 13 as it is wound.

Generally stated it is desirable that the rollers 28 and 29 be approximately at right angles to the line 13. This condition can readily be approximated because the angle subtended by the positions of the line 13 when the reel is full and when it is empty is quite small since the first guide on the rod is spaced some distance from the reel.

The four links 33, 34, 35 and 36 are identical. The scheme of placing the links for one roller above the plate and the links for the other rollers below the plates permits the rollers 28 and 29 to be made identical in length as well as in diameter. The pins 38 and 39 are identical and the pins 31 and 32 are identical. This materially reduces the cost of manufacture.

While one embodiment of the invention has been described in great detail, modifications within the scope of the claims are possible and are contemplated.

What is claimed is:

1. The combination of a fishing reel having a level winding guide carriage; a pair of line guiding rollers between which the fishing line is adapted to pass in contact with the rollers in its passage to and from the reel, the axes of said rollers being in planes to which the axis of the reel is perpendicular; means mounted on said carriage and serving to guide said rollers in paths which converge and are transverse to the axes of the rollers; and yielding means urging said rollers in a converging direction, the parts being so arranged that the draft of the fishing line on said rollers assists said yielding means during winding of the fishing line upon the reel and overpowers said yielding means upon withdrawal of said line from the reel.

2. The combination defined in claim 1 in which the axes of the rollers are approximately at right angles to the fishing line when the diameter of the wound line on the reel is approximately a mean between its maximum and minimum values.

3. The combination defined in claim 1 in which the rollers are of such length that the guide interval between them is at least long enough to accommodate the change in diameter of the wound line upon the reel between its maximum and minimum values.

4. The combination of a fishing reel; a pair of line guiding rollers between which the fishing line is adapted to pass in contact with the rollers in its passage to and from the reel, the axes of said rollers being in planes to which the axis of the reel is perpendicular; a supporting frame in which said rollers are rotatably mounted at their ends, such mounting including converging slots for guiding the ends of the rollers in converging paths transverse to the axes of the rollers; two link mechanisms, one for the upper ends and the other for the lower ends of the pair of rollers, each link mechanism being arranged to constrain the corresponding ends of the rollers to converge and diverge in unison, and comprising two links hinged together and each connected with a corresponding end of a corresponding roller; means for guiding the hinged connection between the two links; and yielding means for urging such hinged connection in a direction to cause convergence of the rollers, the parts being so arranged that the draft of the fishing line during winding upon the reel assists said yielding means in urging the rollers in a converging direction and the draft of the line during withdrawal of the line from the reel overpowers said yielding means and causes the rollers to move in a diverging direction.

5. The combination defined in claim 4 in which the supporting means includes spaced limiting guides for the fishing line to confine its path of motion between limits intermediate the ends of the rollers.

6. The combination defined in claim 4 in which the links of the two pairs connected to one roller are both above the frame member and the links connected to the other roller are both below the frame member whereby the rollers are of the same length.

FRANK V. P. ELLSWORTH.